Jan. 8, 1935.  L. B. HUNTINGTON, JR  1,987,531
LEADER
Filed Jan. 26, 1933
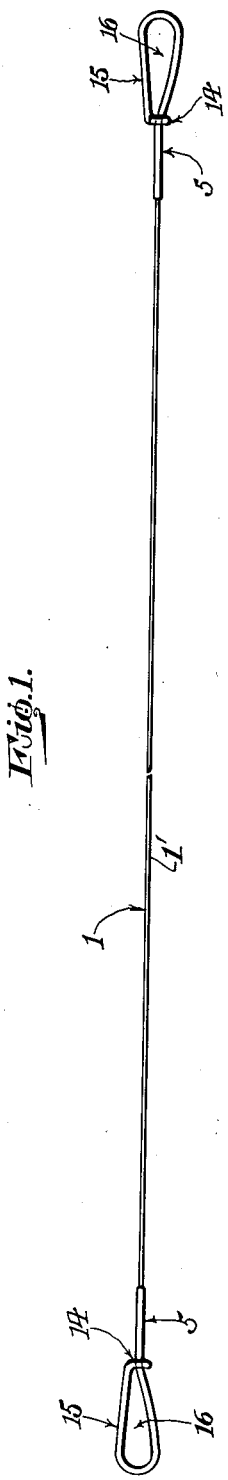
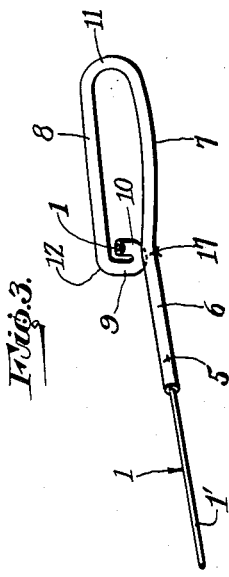
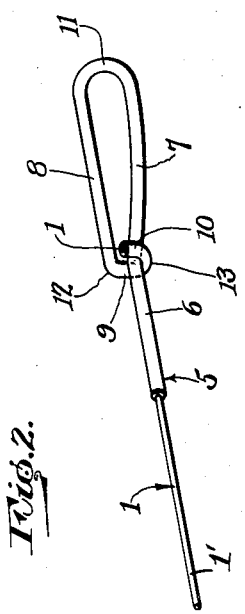
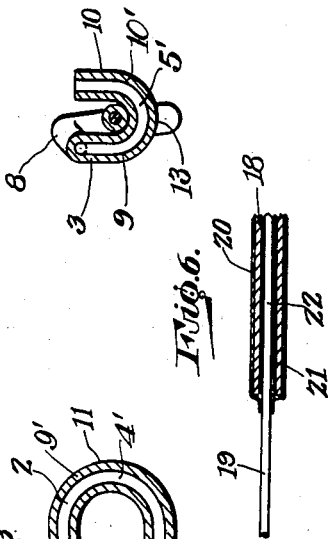
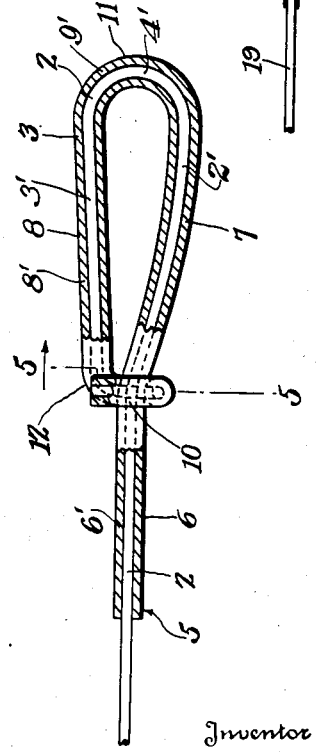
Inventor
L. B. Huntington, Jr.
By Geo. P. Kimmel
Attorney Patented Jan. 8, 1935

1,987,531

UNITED STATES PATENT OFFICE 1,987,531

LEADER

Levin B. Huntington, Jr., Baltimore, Md.

Application January 26, 1933, Serial No. 653,694

4 Claims. (Cl. 43—28)

This invention relates to a leader for use in connection with fishing lines, and has for its object to provide, in a manner as hereinafter set forth, an article of the class referred to having reinforced end portions, and with each of said end portions formed in a manner to provide a normally open combined latch and loop for expeditiously coupling the leader to a line, to a hook or other elements of fishing tackle.

A further object of the invention is to provide, in a manner as hereinafter set forth, a leader so constructed and arranged as to overcome the necessity of wrapping the leader about itself to provide permanent loops or employing ties for maintaining loops at the ends of the leader.

A further object of the invention is to provide, in a manner as hereinafter set forth, a leader having as a permanent part thereof a combined loop and latch forming means at each end thereof for quickly and conveniently coupling it to an eye, ring or loop.

A further object of the invention is to provide, in a manner as hereinafter set forth, a leader having enlarged end terminal portions formed in a manner to provide the leader at its ends with permanent combined loop and latch forming means and with each of said means including a resiliently supported latching member and a fixed keeper capable of being engaged by said member to set up said means in coupling position.

Further objects of the invention are to provide, in a manner as hereinafter set forth, a leader for fishing lines which is simple in its construction and arrangement, strong, durable, compact, thoroughly efficient when used, capable of being expeditiously coupled in position or have expeditiously connected thereto a fishing tackle element, and comparatively inexpensive to manufacture.

To the above ends essentially and to others which may hereinafter appear, the invention consists of such parts and such combination of parts which fall within the scope of the invention as claimed.

In the drawing:

Figure 1 is an elevation of the leader.

Figure 2 is an elevation of an end terminal portion of the leader showing the combined loop and latch forming means closed.

Figure 3 is a view similar to Figure 2 with the combined loop and latch forming means open.

Figure 4 is a sectional elevation of an end terminal portion of the leader.

Figure 5 is a section on line 5—5 Figure 4.

Figure 6 is a fragmentary portion in lengthwise section illustrating a modified form of end terminal portion.

Referring to the drawing, the leader includes a resilient member 1 formed of spring wire of the desired gauge and which has mounted on each terminal portion 2 thereof a bendable metallic tube 3 of the desired inner and outer diameter. The end terminal portions 2 of the member 1 are termed outer stretches and that portion of the member 1 between the portions 2 and indicated at 1' is termed an intermediate stretch. The tube 3 is of greater length than that of an end terminal portion 2, the latter having its outer end edge flush with the outer end of the tube 3. The inner end of the latter is spaced inwardly of an end of the intermediate stretch. The inner diameter of tube 3 preferably will be such as to have its inner face contact with end terminal portion 2. The outer ends of the tubes 3 are flush with the ends of member 1.

The end terminal portions 2 and their associated tubes 3 provide the leader 4 with enlarged reinforced end terminal portions 5 having a part thereof in the form of a loop capable of being opened. Each portion 5 is formed of the stretches 6, 7, 8, 9 and 10 and bends 11, 12 and 13. The stretch 6 is straight, is of greater length than stretches 9, 10 and bends 11, 12, 13 and terminates in stretch 7. The latter is offset with respect to stretch 6 and is directed upon an outward curve. The stretch 8 opposes in spaced relation, is normally horizontal, that is straight with respect to stretch 7, but when the loop is closed, the said part 8 is inwardly inclined from its outer to its inner end and is permanently offset with respect to bend 6. The bend 11 couples the stretches 7 and 8 together and is of materially less length than that of stretch 7 or 8. The stretches 9 and 10 are arranged in parallel spaced relation and are disposed at right angles to the inner end of stretch 8. The length of stretch 9 or 10 is materially less than that of stretch 8. The bend 12 couples stretches 8 and 9 together. The bend 13 couples stretches 9 and 10 together. The stretches 9 and 10 in connection with the bend 13 provide a hook-shaped latching member referred to generally at 14. The stretch 8 provides a resilient support for the member 14 and which is generally indicated at 15. The stretches 7, 8, 9, 10 and bends 11, 12 and 13 provide a normally open loop referred to generally at 16 and which when closed gradually decreases in width from bend 11 to the latching member. The point of joinder of stretch 6 with stretch 7 provides a fixed keeper for the member 14 and which is generally indicated at 17. The tubes provide end terminal portions for the leader. The major portion of the length of each of said portions is bent to provide an elongated substantially oval-shaped loop normally open at its inner end and shiftable means for closing said inner end.

The parts of each composite end terminal portion are termed as follows: the stretch 6 a shank part, the stretches 7, 8 side walls of the loop, stretches 9, 10 and bend 13 the normally disconnected inner end wall of the loop. Each tube acts to reinforce the bends in body 1 to prevent the breaking of the latter at such points.

Each outer stretch 2 is bent at spaced portions of its length to provide a pair of spaced opposed parts 2', 3'; an outwardly curved part 4' of less length than and connecting the outer ends of the parts 2', 3' together; and a U-shaped part 5'. The part 2' is outwardly curved, offset with respect to and has its inner end integral with one end of the intermediate stretch 1'. The part 3' is straight and offset with respect to the intermediate stretch 1'. The U-shaped part 5' is disposed at right angles to the parts 2', 3' and stretch 1' and has one of its ends integral with the inner end of part 3'. The parts 2', 3', 4' and 5' coact to provide an elongated loop normally open at its inner end and consisting of an outer resilient end wall formed by the part 4' and having connected ends, a normally disconnected end wall formed by the part 5' and having a connected and disconnected end, a resilient side wall formed by the part 2' and having connected ends, and a resilient side wall formed by the part 3' and having connected ends.

Each tube 3 includes stretches 6', 7', 8', 9' and 10'. The stretch 6' encompasses a portion of the length of the intermediate stretch 1'. The stretches 7', 8', 9' and 10' conform in contour to and encompass the parts 2', 3', 4' and 5' respectively. The bends between the stretches 6', 7', 8', 9' and 10' of the tube 3 prevent the shifting of the latter relative to the parts 2', 3', 4', 5', and the stretch 1'. The stretches and bends of the tubes 3 reinforce the outer stretches 2 of member 1 and the intermediate stretch 1' at the ends of the latter.

The inner wall of each loop is located relatively to the intermediate stretch 1' for the purpose of overlapping a tube at a point of the latter in alignment with an end of stretch 1' for the purpose of closing the loop.

With reference to the form shown in Figure 6, the tube indicated at 18 has a slightly larger inner diameter than the resilient member 19. A coating 20 is applied to tube 18 and a portion of such coating is extended as at 21 to between member 19 and inner face of tube 18. The tube 18 and end terminal portion 22 of member 19 provide a reinforced end terminal portion for the leader and which is bent to constitute a combined loop and latch forming means of an arrangement corresponding to that shown in Figures 1, 2, 3 and 4.

Although the bends 11, 12 and 13 will prevent terminal portion 2 and tube 3 shifting relatively to each other lengthwise, yet if desired any suitable precaution may be used in addition to the bends to prevent relative movement of portion 2 and tube 3.

What I claim is:—

1. A leader for fishing lines comprising an elongated length of spring wire formed with a pair of end stretches and an intermediate stretch merging at its ends into the inner ends of said other stretches, and a pair of bendable metallic tubes of greater length than either of the end stretches, each of said end stretches being bent at spaced points throughout its length to form a pair of spaced opposed parts offset with respect to said intermediate stretch, one of said parts being integral at its inner end with an end of said intermediate stretch, a part of less length than and connecting the outer ends of said pair of parts together and a U-shaped part disposed at right angles to said pair of parts and having one of its ends merging with the inner end of the other part of said pair of parts, and each of said tubes having the major portion of its length bent at spaced points and with said portion completely encompassing and coacting with the parts of an end stretch to provide an elongated loop having a normally open inner end wall of U-shaped contour and with each of the walls of the loop reinforced, the remaining portions of said tubes being extended upon and encompassing spaced portions of said intermediate stretch, the bends in said tubes providing locks to prevent the shifting of the outer stretches lengthwise with respect to the tubes, and the said U-shaped inner walls being disposed relatively to the ends of the intermediate stretch to removably overlap the said remaining portions of the tubes to close the loops.

2. A leader for fishing lines comprising an elongated length of spring wire formed with a pair of outer stretches and an intermediate stretch merging into said other stretches, and a pair of spaced endwise opposed bendable metallic tubes of greater length than and completely encompassing throughout said outer stretches and encompassing portions of the length of the intermediate stretch extended inwardly from its point of joinder with said outer stretches, each of said outer stretches being formed with a pair of spaced opposed elongated parts offset with respect to said intermediate stretch, one being outwardly curved, integral at its inner end with and extended from one end of said intermediate stretch, the other being straight and free of direct connection with said intermediate stretch, a curved part extending at right angles to and connecting the outer ends of said pair of parts together and a U-shaped part disposed at right angles to said pair of parts and intermediate stretch, said U-shaped part having one end free and its other end merging into the inner end of said straight part, the said parts coacting to form the inner sections respectively of an outer end wall, a normally disconnected open inner end wall, and a pair of resilient side walls of an elongated loop normally open at its inner end, said tubes having the portions thereof encompassing said outer stretches preventing the latter shifting relative to the tubes, forming the outer sections of and reinforcing the walls of the loops and the other portions of said tubes encompassing the intermediate stretch reinforcing the end portions of the latter, and said inner walls of the loops located relative to the intermediate stretch to overlap said tubes at points in alignment with the ends of such stretch to close the loops.

3. A leader for fishing lines comprising an elongated length of spring wire formed with a pair of end stretches and an intermediate stretch merging into said end stretches, and a pair of bendable metallic tubes of greater length than either of the end stretches, each of the end stretches being bent at spaced points throughout its length to form a pair of spaced opposed parts offset with respect to said intermediate part, one of the parts of said pair being outwardly curved and the other straight, said outwardly curved part being integral at its inner end with an end of said intermediate stretch, a curved part connecting the outer ends of said pair of parts together and a U-shaped part having one of its ends connected permanently with the inner end of said straight part and its outer end free, and each of said tubes having the major portion of its length bent at spaced points and with said portion completely encompassing and coacting with the parts of an end stretch to provide an elongated loop having a normally open inner end wall of U-shaped contour and with each of the walls of the loop reinforced, the remaining portions of said tubes being extended upon and encompassing spaced portions of said intermediate stretch, the bends in said tubes preventing the movement of the end stretches lengthwise of the tubes, and the said U-shaped inner walls being disposed relatively to the ends of the intermediate stretch to removably overlap the said remaining portion of the tubes to close the loops.

4. A leader for fishing lines comprising an elongated length of spring wire formed with a pair of outer stretches and an intermediate stretch, and a pair of endwise opposed spaced bendable metallic tubes, each of greater length than either of the outer stretches, each of said outer stretches consisting of an outwardly curved part having its inner end extended from one end of and offset with respect to said intermediate stretch and forming the inner section of one of the reinforced side walls of an elongated loop of substantially oval contour having a normally open inner end, a curved part having one end merging into the outer end of and extending at right angles to said outwardly curved part and forming the inner section of a reinforced outer end wall for the loop, a straight part merging at its outer end into the other end of said right angularly disposed part, extending inwardly at right angles to the latter, permanently offset with respect to said intermediate stretch and forming the inner section of a reinforced resilient wall for the other side of the loop and a U-shaped part having one end free and its other end merging into the inner end of said straight part, disposed at right angles to said straight and outwardly curved parts and forming the inner section of a normally open wall for the inner end of the loop, each of said tubes having the major portion of the length thereof encompassing throughout the said parts of an outer stretch to provide the outer sections of the walls of the loop, each of said tubes having the remaining portion of its length encompassing a part of the intermediate stretch extending inwardly from and end of the latter, and said inner walls being located with respect to the intermediate stretch for detachable engagement against said remaining portions of said tubes at points in alignment with the ends of the intermediate stretch.

LEVIN B. HUNTINGTON, Jr.